(12) United States Patent
Fujimoto et al.

(10) Patent No.: US 6,373,635 B1
(45) Date of Patent: Apr. 16, 2002

(54) LENS ARRAY, METHOD OF MAKING THE SAME, AND LENS

(75) Inventors: Hisayoshi Fujimoto; Hiroaki Onishi, both of Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/654,576

(22) Filed: Sep. 1, 2000

(30) Foreign Application Priority Data

Sep. 3, 1999 (JP) .......................................... 11-249533

(51) Int. Cl.[7] .............................................. G02B 27/10
(52) U.S. Cl. ...................................... 359/619; 359/620
(58) Field of Search ................................. 359/619, 620

(56) References Cited

U.S. PATENT DOCUMENTS

| | | | | |
|---|---|---|---|---|
| 3,706,486 A | * | 8/1970 | de Montebello | 359/619 |
| 4,034,555 A | * | 7/1977 | Rosenthal | 359/232 |
| 4,961,802 A | | 10/1990 | Otsuki et al. | 156/153 |
| 5,568,313 A | * | 10/1996 | Steenblik | 359/463 |
| 5,579,164 A | * | 11/1996 | Chapnik | 359/618 |

FOREIGN PATENT DOCUMENTS

| | | | |
|---|---|---|---|
| EP | 0 316 507 | 5/1989 | G02B/3/00 |
| EP | 0 825 460 | 2/1998 | G02B/3/00 |
| JP | 61050101 | 3/1986 | G02B/3/00 |
| JP | 01040901 | 2/1989 | G02B/3/00 |
| JP | 04141601 | 5/1992 | G02B/3/00 |
| JP | 09222505 | 8/1997 | G02B/3/00 |
| JP | 11-23805 | 1/1999 | G02B/3/00 |

OTHER PUBLICATIONS

English Abstract of JP–A–11–23805, Jan. 29, 1999.

English Language Abstracts of Japanese Patent Pub. Nos. 01040901, 04141601, 09222505 and 61050101. Copy of German Search Report.

* cited by examiner

Primary Examiner—Georgia Epps
Assistant Examiner—Gary O'Neill
(74) Attorney, Agent, or Firm—Michael D. Bednarek; Shaw Pittman LLP

(57) ABSTRACT

A lens array includes a plurality of lenses, a holder portion for fixing the lenses, and an acrylic transparent layer for covering the lens surfaces of the respective lenses. The holder portion and the lenses are made of the same transparent resin to be formed as a one-piece element. The lens array also includes a dark-colored light shielding layer for preventing the unwanted passage of light. The transparent layer is formed on the light shielding layer for preventing the latter from peeling off.

20 Claims, 20 Drawing Sheets

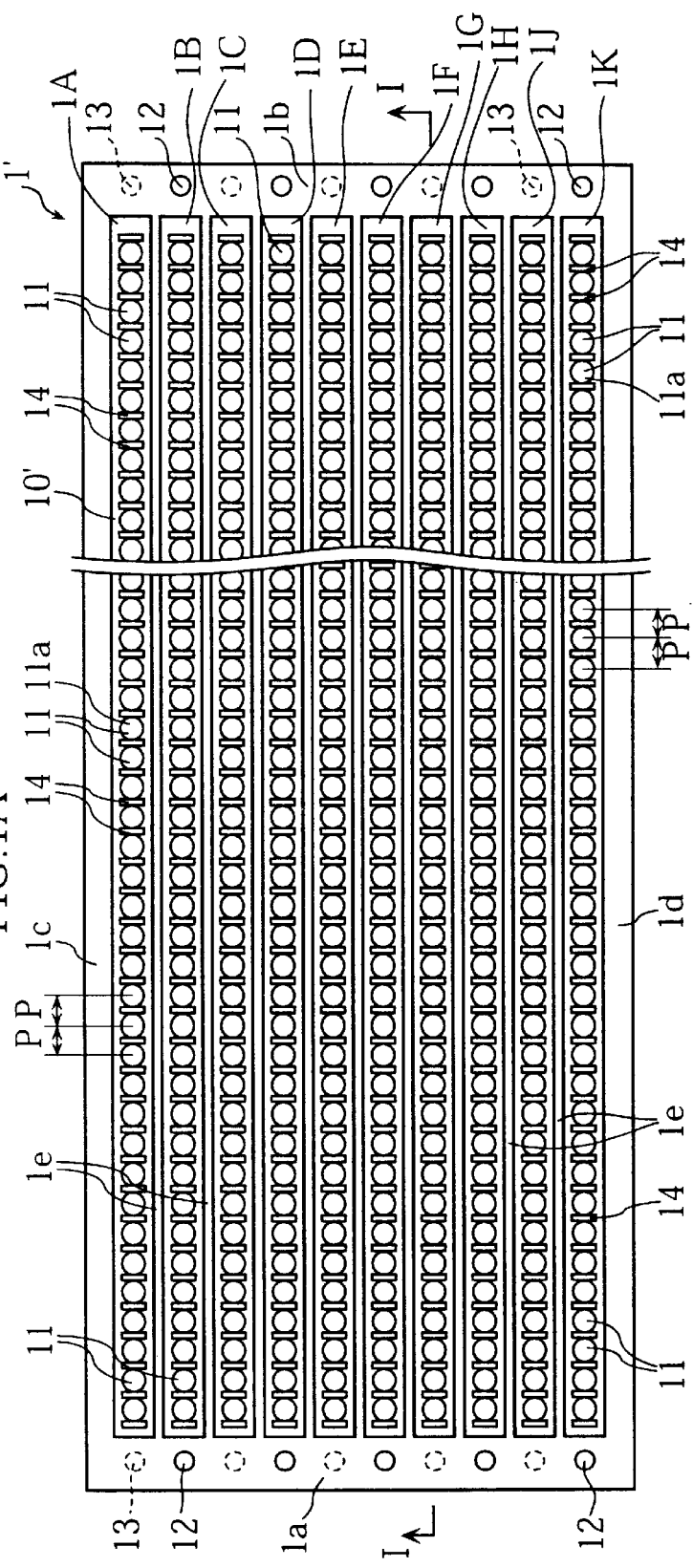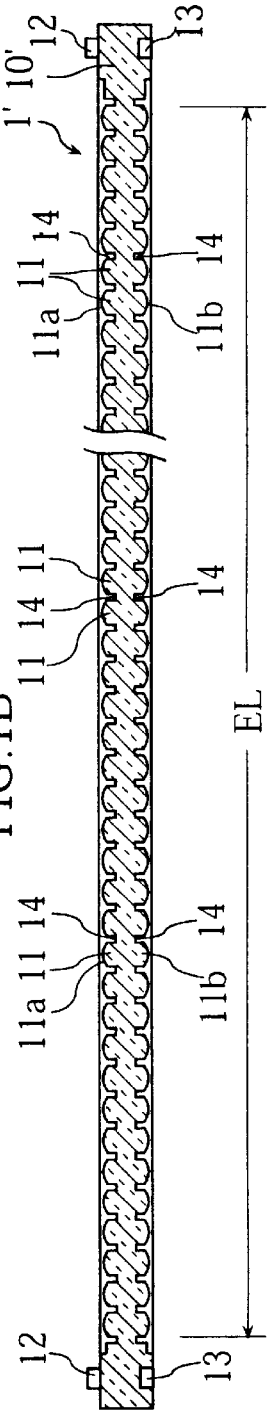
FIG.1A
FIG.1B

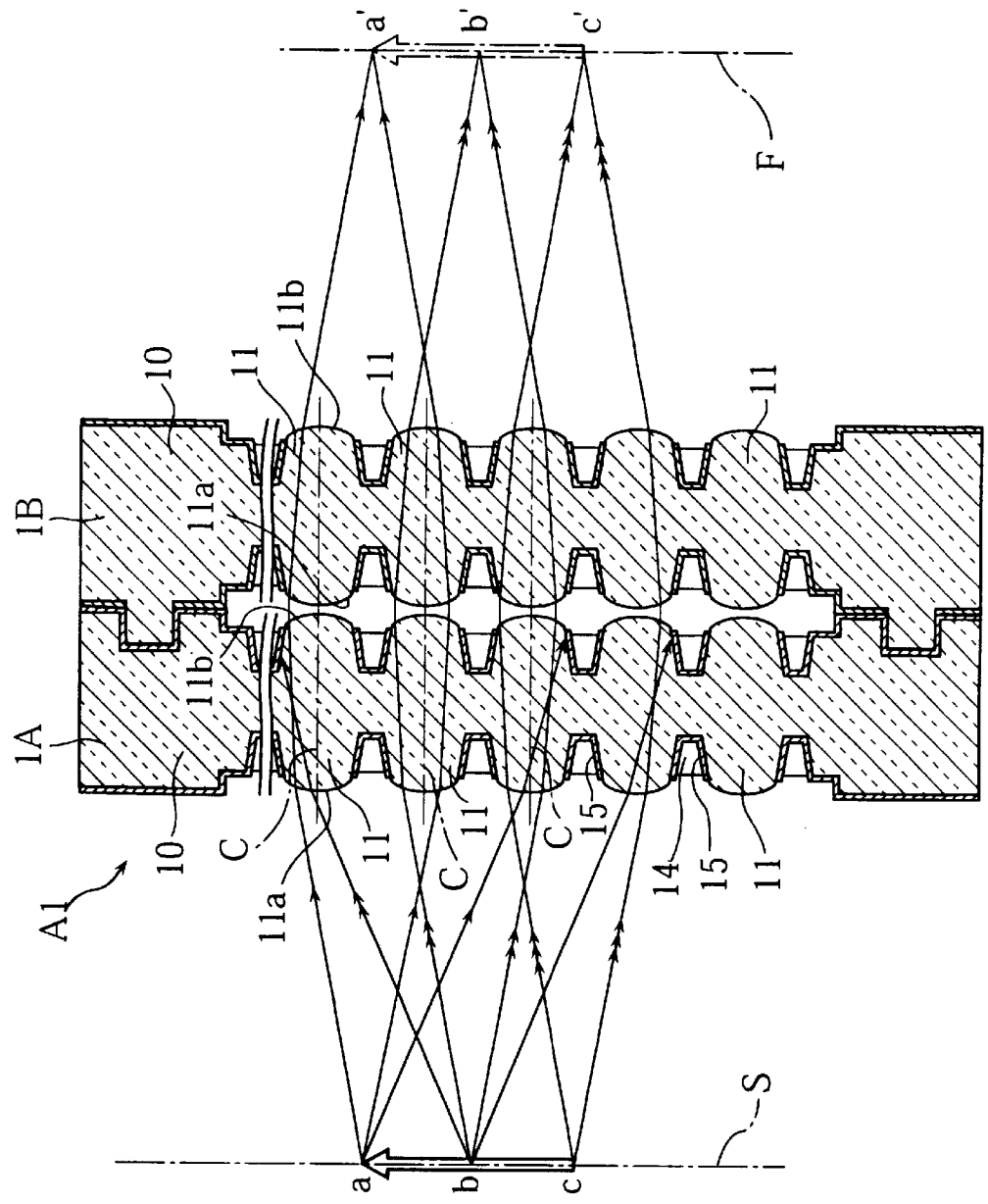

LENS ARRAY, METHOD OF MAKING THE SAME, AND LENS

BACKGROUND OF THE INVENTION

1. Field of the Invention

The present invention relates to a lens array. In particular, it relates to a lens array of the type which is used in an optical device such as a contact-type image sensor for focusing the images on a document onto linearly arranged light receiving elements. The present invention also relates to a method of making such a lens array and a lens.

2. Description of the Related Art

A conventional lens array of the above-mentioned type is provided with a plurality of lenses which are produced separately from each other. These lenses are arranged in an array and held together by a holder which is prepared separately from the lenses. The lenses may be convex lenses made of glass, while the holder may be made of a synthetic resin. In place of the convex lenses, a plurality of self-focusing lenses (rod lenses) may be used for producing the image of an object in a non-inverting and non-magnifying manner.

The conventional lens array is disadvantageous in the following points.

Specifically, the production procedure of the conventional lens array tends to be unduly complicated since the respective lenses and the holder are produced separately from each other. The smallness of each lens (the diameter may often be smaller than 1 mm) and the multiplicity of the lenses aggravate the situation. As readily understood, it is very difficult to accurately position a great number of small lenses within the holder.

Another drawback of the conventional lens array is that light tends to be unduly scattered at the lens surface of each lens due to unevenness of the lens surface. With the use of such a lens array, reproduction of a clear image cannot be expected.

SUMMARY OF THE INVENTION

The present invention has been proposed under the above-described circumstances, and its object is to produce, efficiently and at low costs, lens arrays or lenses exhibiting an excellent optical performance.

According to a first aspect of the present invention, there is provided a lens array comprising: a plurality of lenses each of which is provided with a lens surface; a holder portion for fixing the lenses; and a transparent layer for covering at least the lens surface of each lens.

With such an arrangement, the lens surface of each lens is smoothed out by the transparent layer, which is advantageous to improving the optical performance of the lens. The transparent layer may be made of an acrylic material.

Preferably, the holder portion and the lenses may be made of a same transparent resin material and formed as a one-piece element. A lens array having such features is readily produced by a molding technique. Thus, in comparison with the conventional lens array, the production efficiency is improved and the production costs are advantageously reduced.

Preferably, a light shielding layer may further be formed on at least part of the holder portion. The light shielding layer serves to prevent unwanted light from entering or leaving the lens array.

Preferably, the holder portion may be provided with a plurality of grooves, wherein each of the lenses is located between two grooves. Further, each of the grooves may be provided with inner wall surfaces covered by the light shielding layer. With such an arrangement, the cross talk of light is prevented, which improves the optical performance of the lens array.

Preferably, the light shielding layer may be rendered dark-colored (in particular, black) for facilitating the absorption of unwanted light.

Preferably, the transparent layer may overlap the light shielding layer. In this manner, the light shielding layer is protected by the transparent layer from mechanical damage, while also being secured to the holder portion or the lenses under the transparent layer.

Preferably, the lens array of the present invention may further comprise engaging means for associating with an additional lens array. With such an arrangement, a lens array assembly is readily constituted by combining more than one lens array.

Preferably, each of the lenses may be provided with first and second lens surfaces which are unequal in diameter to each other.

According to a second aspect of the present invention, there is provided a method of making a lens array. The method comprises the steps of: molding a transparent resin material into a resin element provided with a plurality of lenses; and forming a transparent layer for covering at least a lens surface of each lens.

Preferably, the method may further comprise a step of dividing the resin element into a plurality of lens arrays.

Preferably, the transparent layer may be formed by spraying a transparent acrylic material onto the lens surface of each lens. In this manner, the acrylic material can be uniformly applied over a wide area. In general, an acrylic paint material has advantageously high transparency. Also, an acrylic paint is easy to handle and less expensive than other materials, which is advantageous to reducing the production costs.

Preferably, the viscosity of the acrylic material may be in a range of 10 mP–100 mP at 20° C.

Preferably, the method of the present invention may further comprise a step of forming a light shielding layer on the resin element before the forming of the transparent layer.

Preferably, the transparent layer may overlap the light shielding layer. With such an arrangement, the transparent layer, which is arranged on the light shielding layer, prevents the light shielding layer from peeling off.

Preferably, the light shielding layer may be formed by ejecting dark-colored ink onto the resin element. The ejecting of the ink may be performed by an inkjet printer.

According to a third aspect of the present invention, there is provided a lens comprising: a transparent body provided with a lens surface; and a transparent layer covering the lens surface.

The lens surface may be curved. For instance, the lens surface may be convex or concave.

Other features and advantages of the present invention will become apparent from the detailed description given below with reference to the accompanying drawings.

BRIEF DESCRIPTION OF THE DRAWINGS

FIG. 1A is a plan view showing an interim resin product prepared for collectively providing a plurality of lens arrays embodying the present invention;

FIG. 1B is a sectional view taken along lines I—I in FIG. 1A;

FIG. 14A is a sectional view illustrating the function of the lens assembly of FIG. 13;

DETAILED DESCRIPTION OF THE PREFERRED EMBODIMENTS

The preferred embodiments of the present invention will be described below with reference to the accompanying drawings.

Reference is first made to FIGS. 1–12 illustrating a method of collectively making a plurality of lens arrays embodying the present invention.

Figure 2:
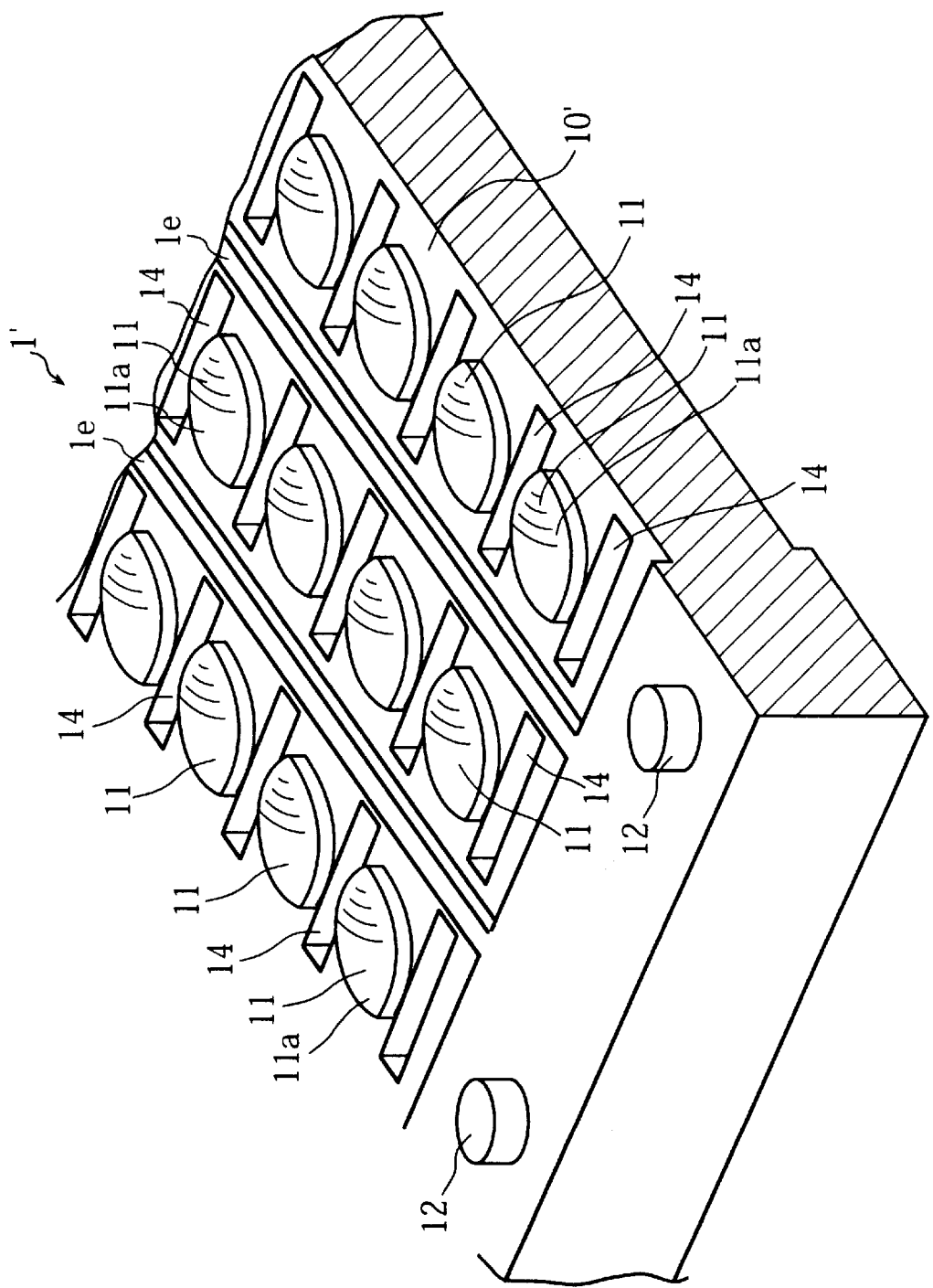
FIG. 2 is an enlarged view showing a principal part of the interim product of FIG. 1A.
Figure 3:
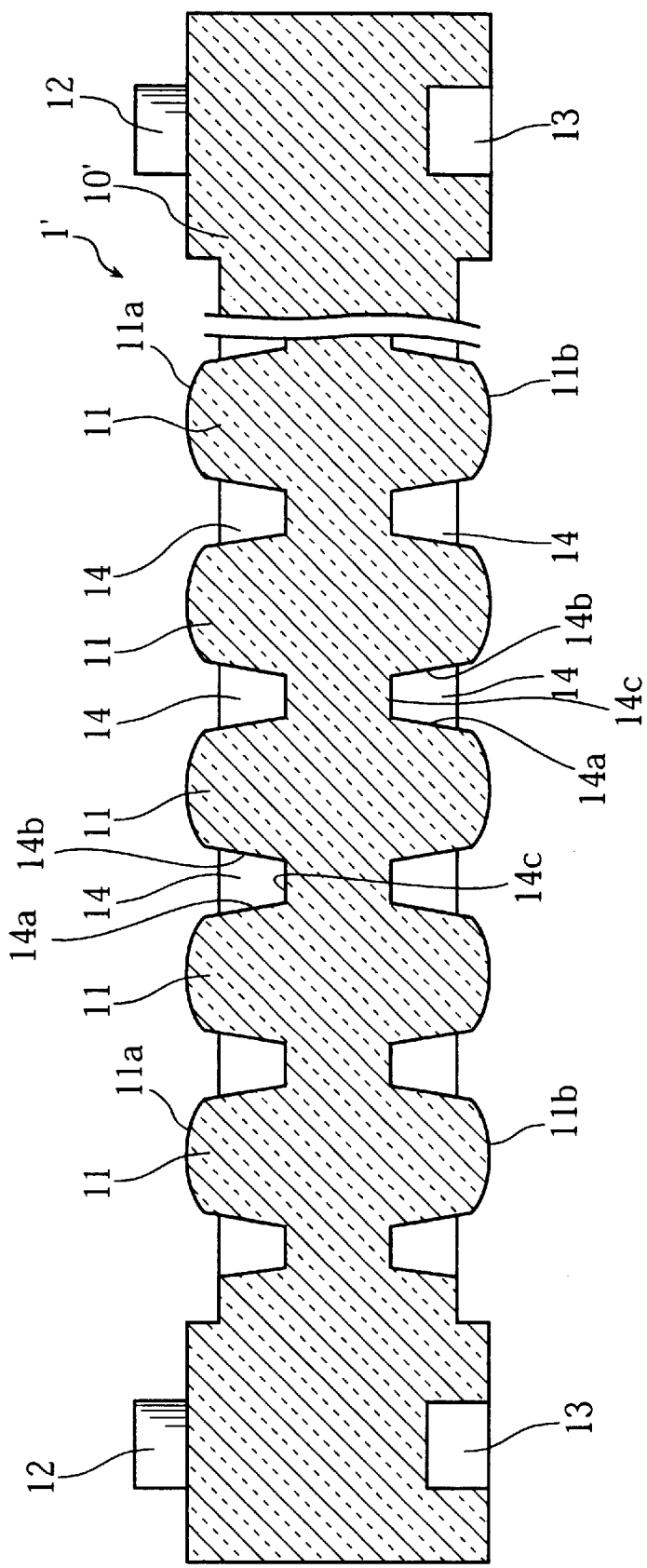
FIG. 3 is an enlarged sectional view showing the interim product of FIG. 1A.

In accordance with the illustrated method, first an interim resin product 1' shown in FIGS. 1–3 is prepared. The interim product 1' is a plate or sheet having a generally rectangular configuration and may be made of a transparent synthetic resin material such as PMMA (polymethylmethacrylate) or PC (polycarbonate), which exhibit excellent transparency and sufficient mechanical strength.

As shown in FIGS. 1–3, the interim product 1' is provided with a plurality of lenses 11, a holder portion 10' for holding the lenses 11, a plurality of grooves 14, a plurality of projections 12 and a plurality of recesses 13. In the illustrated example, the lenses 11 are grouped into ten arrays (1A–1K) each of which extends longitudinally of the rectangular interim product 1', as shown in FIG. 1A. In each lens array, the individual lenses 11 are arranged at a constant pitch P (1 mm for example). The grooves 14 are formed in both the upper surface and the lower surface of the interim product 1', as seen from FIG. 1B or FIG. 3. In plan view (FIG. 1) or bottom view (not shown), each lens 11 is flanked by two grooves 14. The ten lens arrays 1A–1K are spaced from each other in the widthwise direction of the interim product 1'. As shown in FIG. 1B, each lens array has a prescribed effective length EL. For instance, the effective length EL may be rendered greater than 210 mm for dealing with a DIN A4-size document.

As best shown in FIG. 3, each of the lenses 11 is provided with a convex upper lens surface 11a and a convex lower lens surface 11b opposite to the upper lens surface 11a. These lens surfaces may be spherical or non-spherical. A spherical lens surface is made more easily than a non-spherical surface. However, a non-spherical lens surface is preferable for reducing aberration and hence for producing a distinct image of an object. The diameters of the upper and the lower lens surfaces are equal and may be about 0.6 mm.

The holder portion 10' is the remainder of the interim product 1' except for the lenses 11 and the projections 12.

As mentioned above, the grooves 14 are formed on the upper and the lower side of the interim product 1'. As shown in FIGS. 1A and 2, each groove 14 has a rectangular opening which is elongated transversely to the longitudinal direction of the lens array. As shown in FIG. 3, each groove 14 is provided with inclined inner walls 14a, 14b and tapers toward the bottom wall 14c of the groove.

As will be described later, the projections 12 and the recesses 13 are provided for causing a lens array obtained from the interim product 1' to be attached to another lens array obtained from the same interim product 1'. As shown in FIGS. 1A and 1B, the projections 12 are formed on the upper surface of the interim product 1'. One of the projections 12 is located at the right end of the second lens array 1B, while the counterpart projection is located at the left end of the same lens array 1B. Similarly, the remaining projections 12 are located at the right end or left end of the fourth (1E) or sixth (1F) or eighth (1H) or tenth (1K) lens array.

On the other hand, the recesses 13 are formed in the lower surface of the interim product 1'. As shown in FIG. 1A, one recess 13 is located at the right or left end of any one of the first (1A), third (1C), fifth (1E), seventh (1G) and ninth (1J) lens arrays.

As shown in FIG. 1A, the interim product 1' is provided with two shorter end portions 1a, 1b, at which the projections 12 and the recesses 13 are arranged. The interim product 1' is also provided with two longer end portions 1c, 1d extending perpendicularly to the shorter end portions 1a, 1b.

Further, the interim product 1' is provided with a plurality of elongated intermediate portions 1e extending in parallel to the longer end portions 1c, 1d. The intermediate portions 1e separate the respective lens arrays 1A–1K from each other. The above-mentioned end portions 1a, 1b, 1c, 1d and the intermediate portions 1e are greater in thickness than the other portions of the interim product 1', as can be seen from FIGS. 2 and 3.

Figure 4:
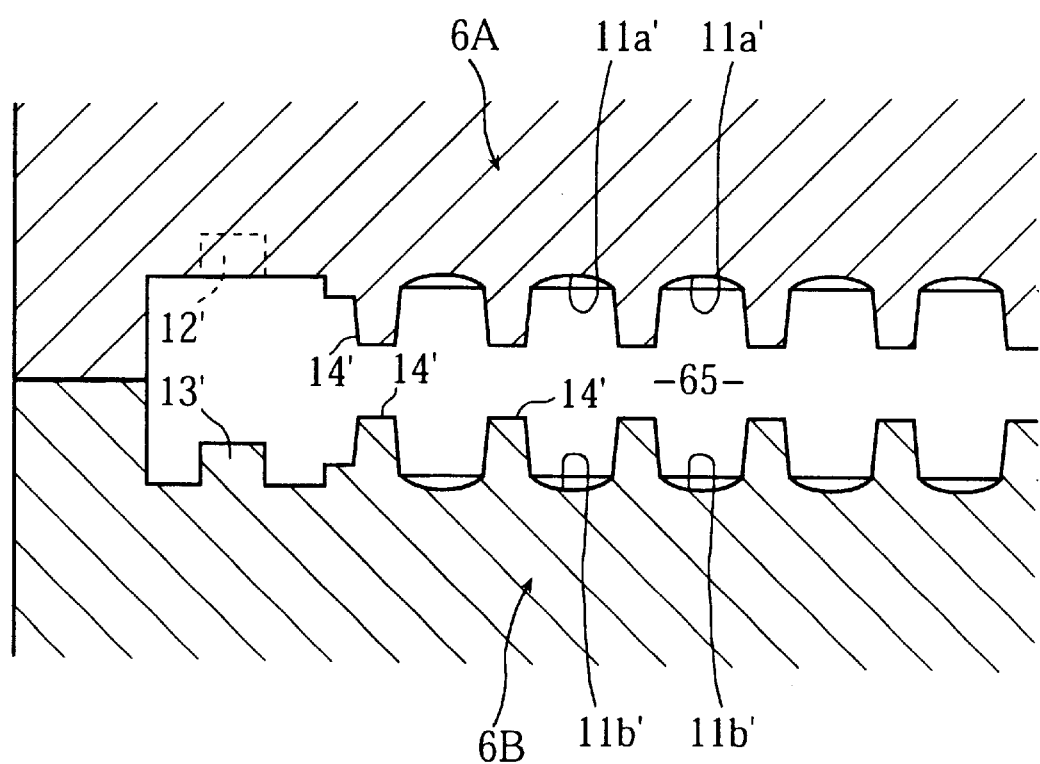
FIG. 4 is a sectional view showing molding members used for producing the interim product of FIG. 1A.
Figure 5:
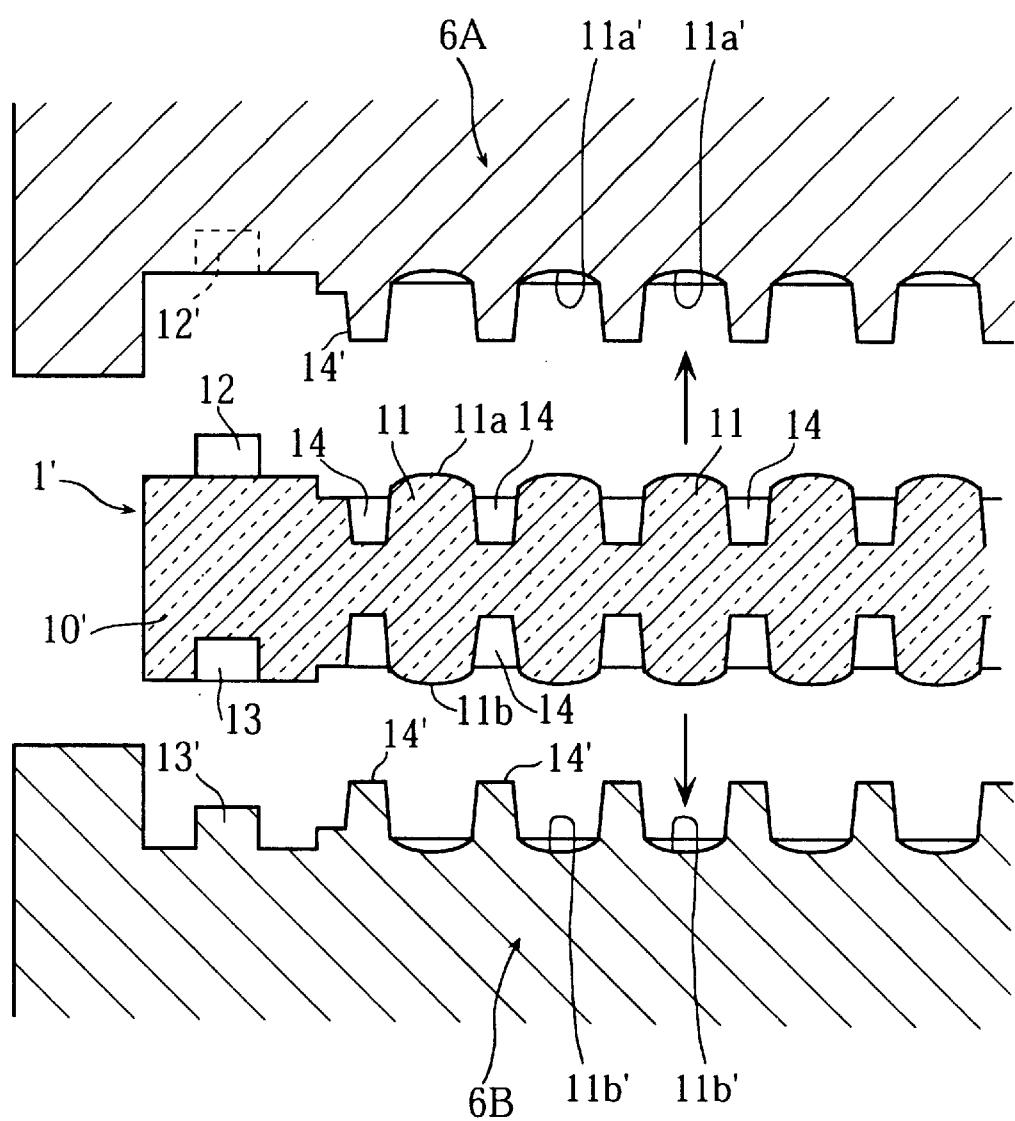
FIG. 5 is a sectional view showing an interim product taken out from the molding members.

The interim product 1' may be produced by a molding technique using an upper molding member 6A and a lower molding member 6B shown in FIGS. 4 and 5. The paired molding members 6A and 6B are formed with inner surfaces defining a cavity 65. These inner surfaces include a plurality of concave portions 11a' and 11b' which correspond to the upper lens surfaces 11a and the lower lens surfaces 11b, respectively. As best shown in FIG. 5, the molding members 6A and 6B are formed with a plurality of protrusions 14'corresponding to the grooves 14 of the interim product 1'. The upper molding member 6A is also provided with a plurality of recesses 12' for forming the projections 12 of the interim product 1'. The lower molding member 6B is provided with a plurality of protrusions 13' for forming the recesses 13 on the bottom side of the interim product 1'.

The molding procedure may be performed in the following manner. First, a molten synthetic resin material is poured into the cavity 65 formed by the cooperation of the two molding members 6A and 6B (FIG. 4). Then, after filling the cavity 65, the poured resin material is hardened. Then, as shown in FIG. 5, the upper and the lower molding members 6A, 6B are separated from each other, whereby a desired interim product 1'is obtained.

In the illustrated example, the four end portions 1a–1d and the intermediate portions 1e have a comparatively great thickness, as mentioned above. Accordingly, the cavity 65 is rendered greater in thickness at portions corresponding to the above-mentioned thicker portions of the interim product 1'. Such an arrangement is advantageous to causing the poured molten resin material to smoothly fill up the cavity 65.

According to the present invention, the grooves 14 of the interim product 1' may not be made by a molding method as described above. Instead, an interim resin product with no such grooves may be subjected to mechanical processing using a cutting tool such as an end mill. The grooves 14 may also be made by laser processing.

Figure 6:
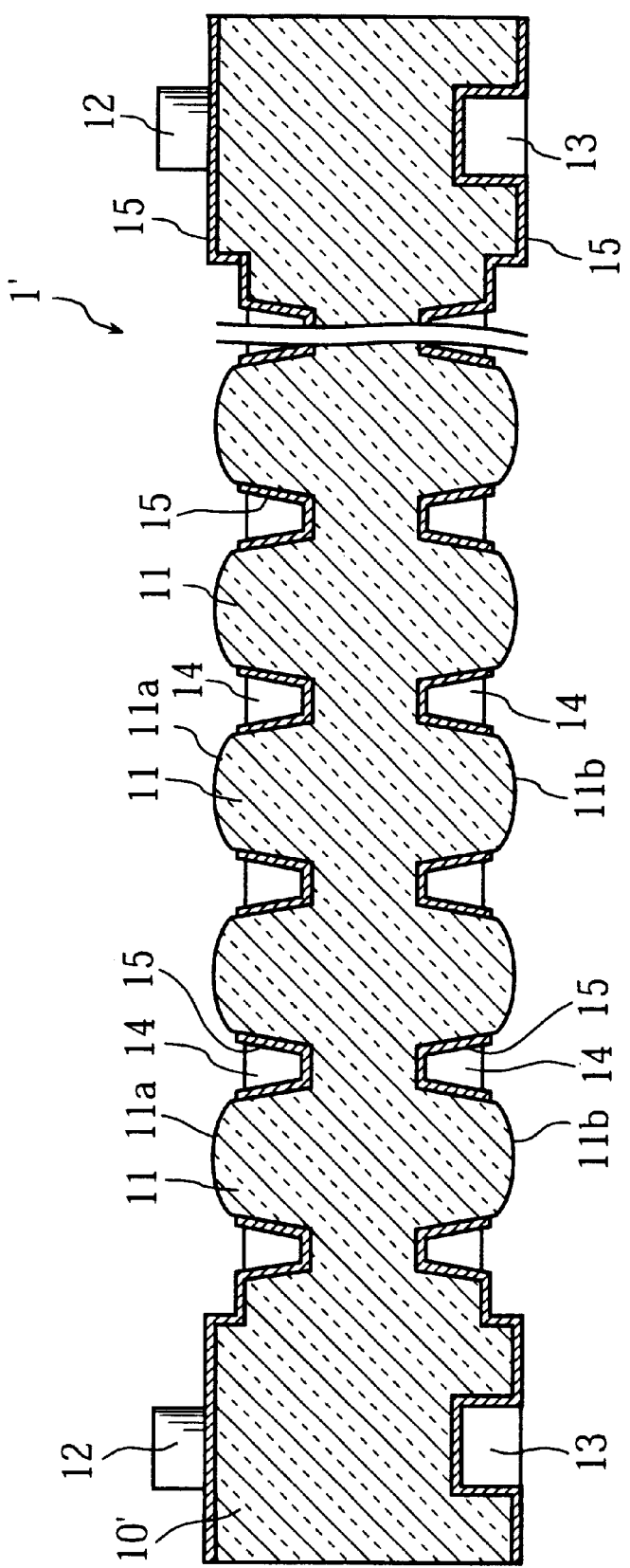
FIG. 6 is a sectional view showing the interim resin product on which a light shielding layer.

Following the molding procedure shown in FIGS. 4 and 5, a step of applying black paint is performed to form a light shielding layer 15 on the interim product 1', as shown in FIG. 6. The light shielding layer 15 covers most of the surfaces of the interim product 1' but is not formed on the upper and lower lens surfacese 11a, 11b of the respective lenses 11.

Figure 7:
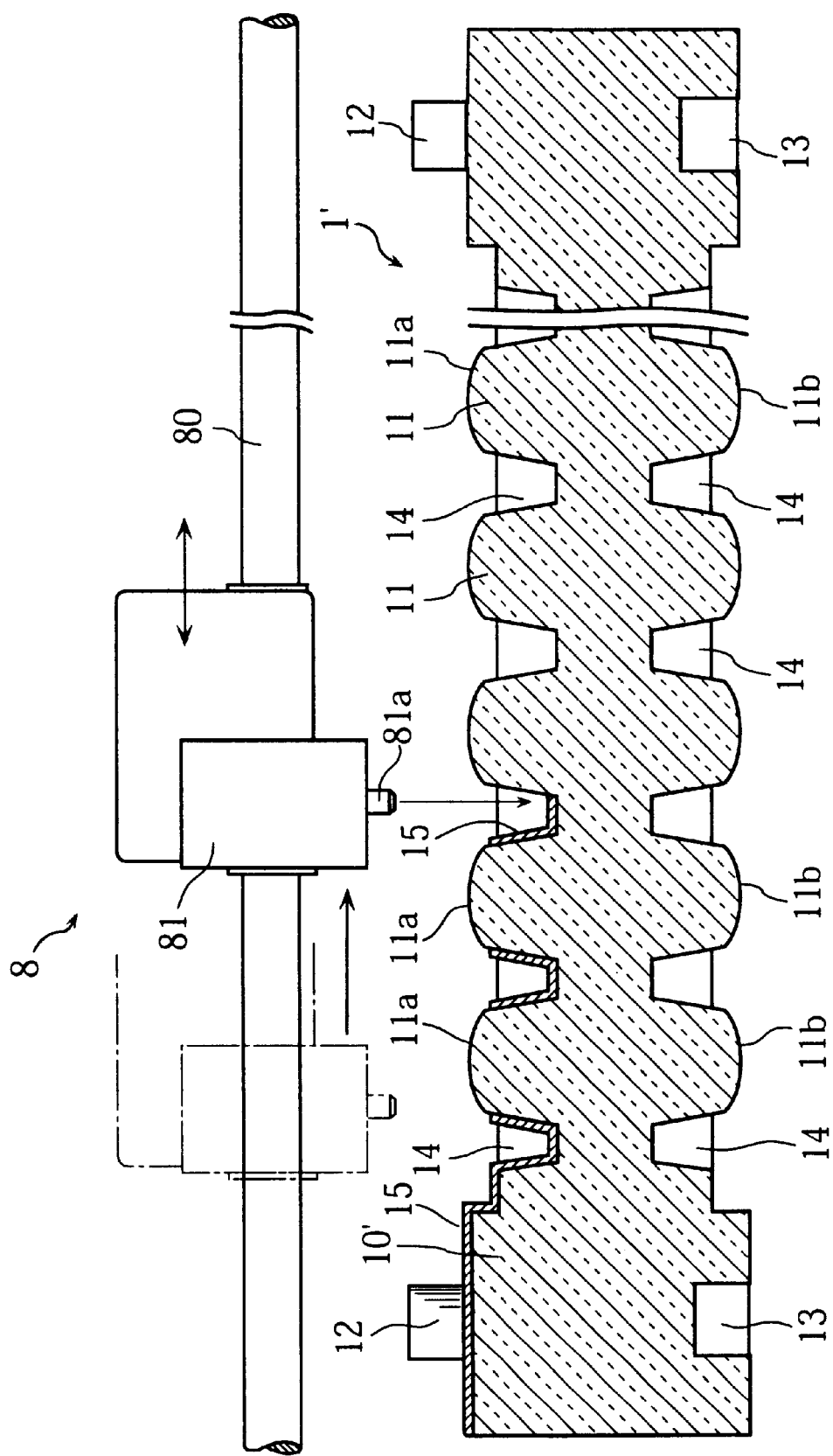
FIG. 7 illustrates how the light shielding layer is formed on the interim resin product.

As shown in FIG. 7, use may be made of an inkjet printer 8 for applying the black paint onto the prescribed portions of the interim product 1'. The inkjet printer 8 includes a printer head 81 provided with an inkjet nozzle 81a. The printer head 81 is slidably supported by a horizontal guide rod 80. A non-illustrated driving mechanism causes the printer head 81 to slide along the guide rod 80, as indicated by the two-headed arrow in FIG. 7. The guide rod 80 is not stationary relative to the interim product 1' but horizontally movable in a direction perpendicular to the reciprocative directions of the inkjet printer 8. Thus, the printer head 81 is cause to move in a horizontal plane relative to the interim product 1'. Though not illustrated in FIG. 7, a controller is provided for causing the printer head 8 to eject ink onto a desired part of the external surface of the interim product 1'.

With the use of the inkjet printer 8 operating under the control of the non-illustrated controller, the applying of ink can be performed only to the selected portions of the interim product 1'. Thus, without using a mask, the light shielding layer 15 is properly formed on the interim product 1' in a manner avoiding the lens surfaces 11a, 11b of the respective lenses 11.

As shown in FIGS. 6 and 7, each groove 14 tapers toward the bottom surface thereof, so that ink ejected from the inkjet nozzle 81a is properly applied onto the inclined inner surfaces as well as the bottom surface of the groove 14. When the grooves 14 taper to a smaller degree than in the illustrated example (for instance, when the inclined inner surfaces of the groove 14 are substantially upright), the ejected ink may fail to be properly applied onto the inner surfaces of the groove 14. In this case, a relatively large amount of ink may be ejected into each groove 14 so that the groove is generally filled with the ink.

According to the present invention, the light shielding layer 15 may not necessarily be made by the inkjet printer 8. Instead, the interim product 1' may be immersed in black paint for a while and taken out. Then, the paint adhered to the upper and lower lens surfaces 11a, 11b of the respective lenses 11 may be wiped away before the paint becomes hard. Of course, a masking technique may be used for painting the interim product 1'except for the lens surfaces 11a, 11b of the respective lenses 11. Advantageously, the light shielding layer 15 is black. However, other dark colors may suffice if the layer 15 can properly shield light.

Figure 8:
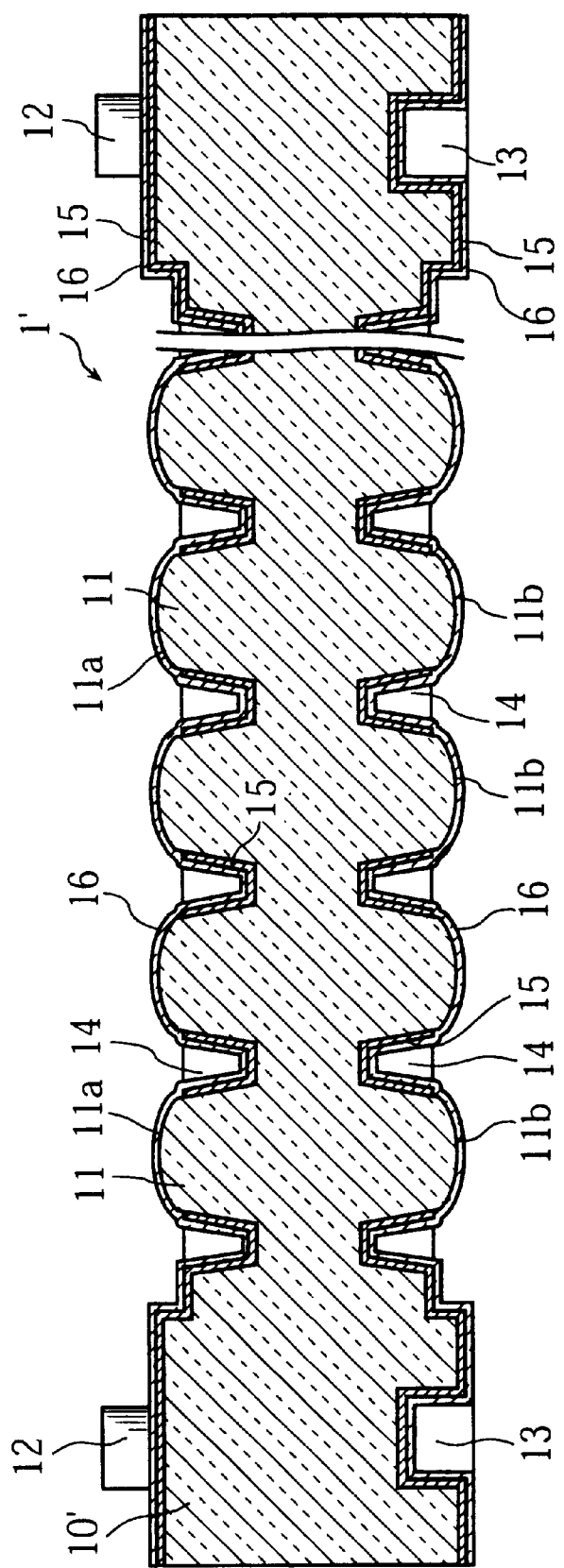
FIG. 8 is a sectional view showing the interim resin product on which a transparent layer is formed.

Referring to FIG. 8, a transparent layer 16 is formed on all or part of the surfaces of the interim product 1' after the light shielding layer 15 is formed. As illustrated, the transparent layer 16 covers, at least, the upper and lower lens surfaces 11a, 11b of each lens 11 and the light shielding layer 15. The transparent layer 16 may be made of an acrylic resin material and has a small thickness of 5–10 $\mu$m. At the upper and lower lens surfaces 11a, 11b in particular, the transparent layer 16 is rendered to have a uniform (or generally uniform) thickness, so that the curvature of the transparent layer 16 is substantially equal to that of the lens surfaces 11a, 11b.

Figure 9:
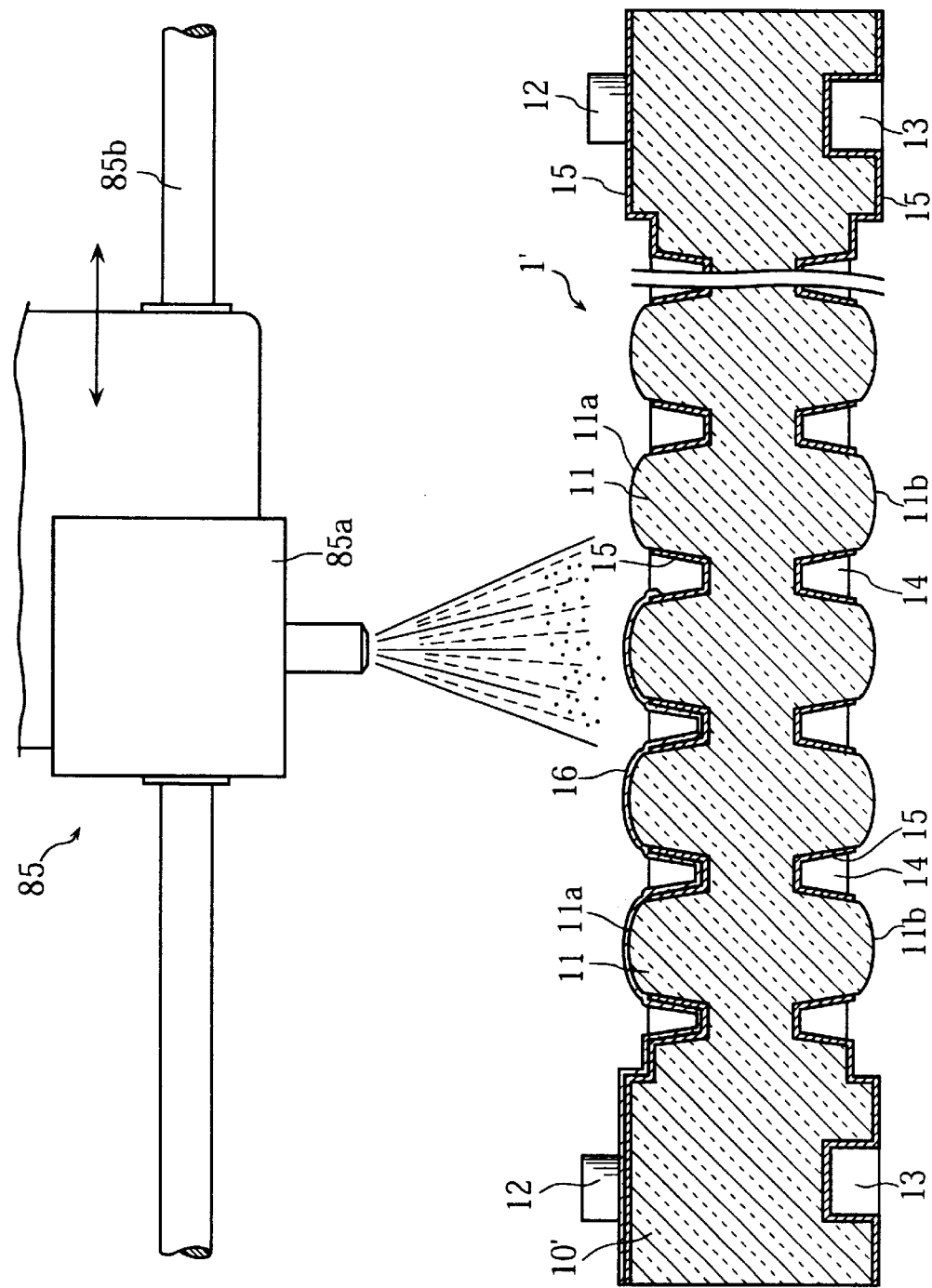
FIG. 9 illustrates how the transparent layer is formed.

The forming of the transparent layer 16 may be performed using a paint-spraying device 85, as shown in FIG. 9. The spraying device 85 is provided with a spray head 85a and arranged to slide on a horizontal guide rod 85b extending longitudinally of the interim product 1'. As the spraying device 85 is being moved along the guide rod 85b, a suitable amount of transparent paint is being sprayed from the nozzle of the spray head 85a to be applied onto the interim product 1'. For moving the spraying device 85 in the widthwise direction of the interim product 1', the guide rod 85b is arranged to move in that direction relative to the interim product 1', which is stationary. Alternatively, the interim product 1' may be moved relative to the guide rod 85b which is stationary.

Figure 10:
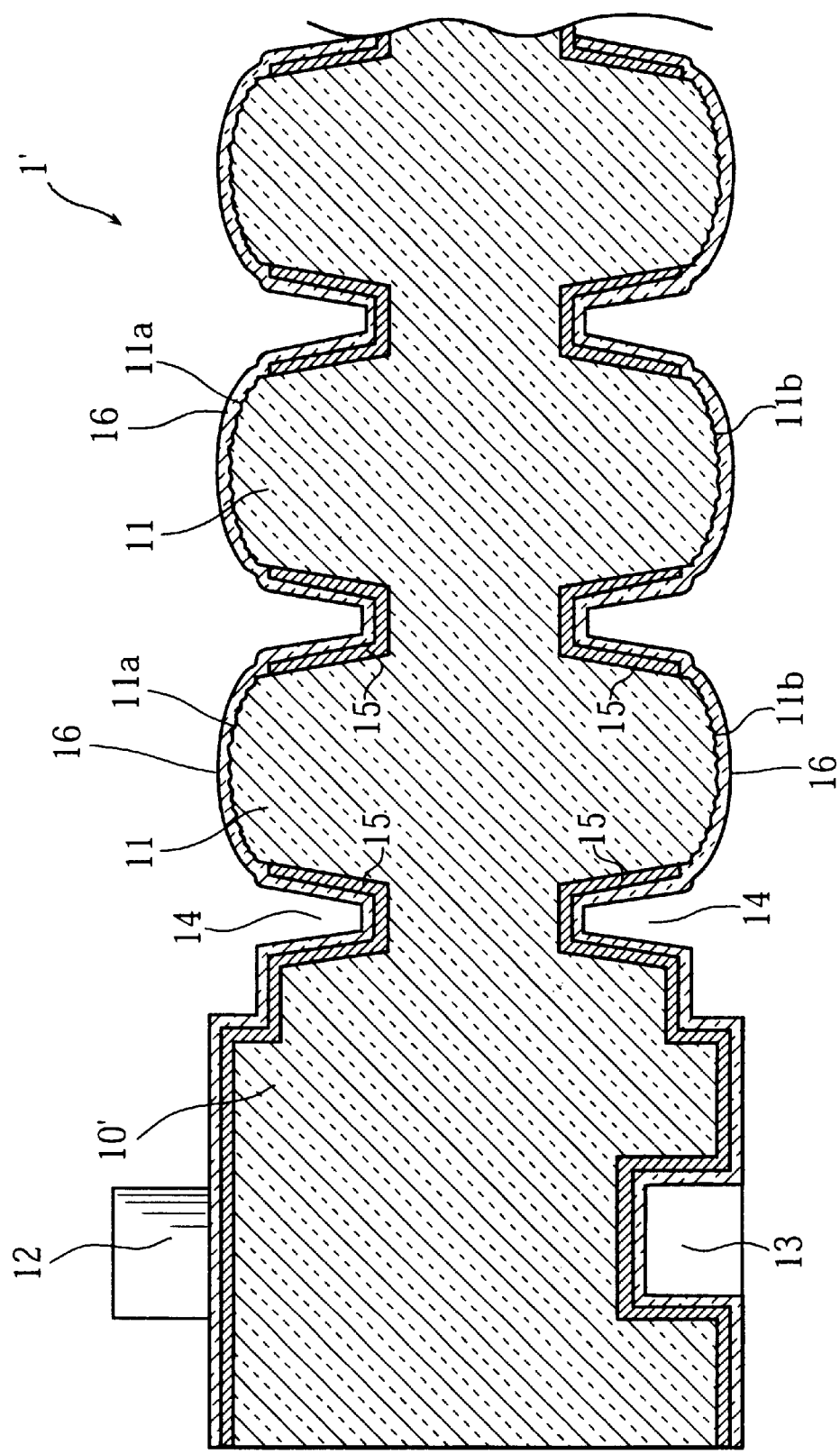
FIG. 10 is an enlarged sectional view showing how the transparent layer smoothes out lens surface irregularities.

One of the advantages in forming the transparent layer 16 is to smooth out the lens surfaces 11a, 11b of each lens 11 which may originally be rather rough, as shown in FIG. 10. With the transparent layer 16, light incident upon or leaving the lens 11 is prevented from being unduly scattered at the upper or lower lens surface 11a or 11b.

A preferable acrylic resin material for forming the transparent layer 16 may be water-base acrylic transparent varnish (produced by Sunday Paint) diluted 1.5–10 times with distilled water. (A varnish diluted "n" times with water may contain 1 cc of varnish and (n−1)cc of water.) The inventors of the present invention have found that almost no bubbles are generated in the transparent layer 16 when the above-mentioned diluted varnish is sprayed onto the interim product 1' at room temperature. Another preferable paint material for forming the transparent layer 16 may be the above-mentioned water-base acrylic transparent varnish diluted 1.5–10 times with ethyl alcohol. With this paint material again, no bubbles are generated in the resulting layer 16. Having conducted some experiments, the inventors also have found that the resulting transparent layer 16 will exhibit excellent surface smoothness when the viscosity of the acrylic resin material to be used is in a range of 10–100 mP (20° C.).

Another advantage to forming the transparent layer 16 is as follows. Referring to FIG. 10, the resulting transparent layer 16 overlaps the light shielding layer 15. In this manner, the transparent layer 16 prevents the light shielding layer 15 from peeling off the interim product 1'. It should be noted here that the interim product 1', which is made of PMMA, can be more firmly attached to the transparent layer 16 (made of acrylic material) than to the light shielding layer 15. Thus, the transparent layer 16, comparatively firmly attached to the exposed lens surfaces 11a or 11b, keeps the light shielding layer 15 attached to the interim product 1'.

Figure 11:
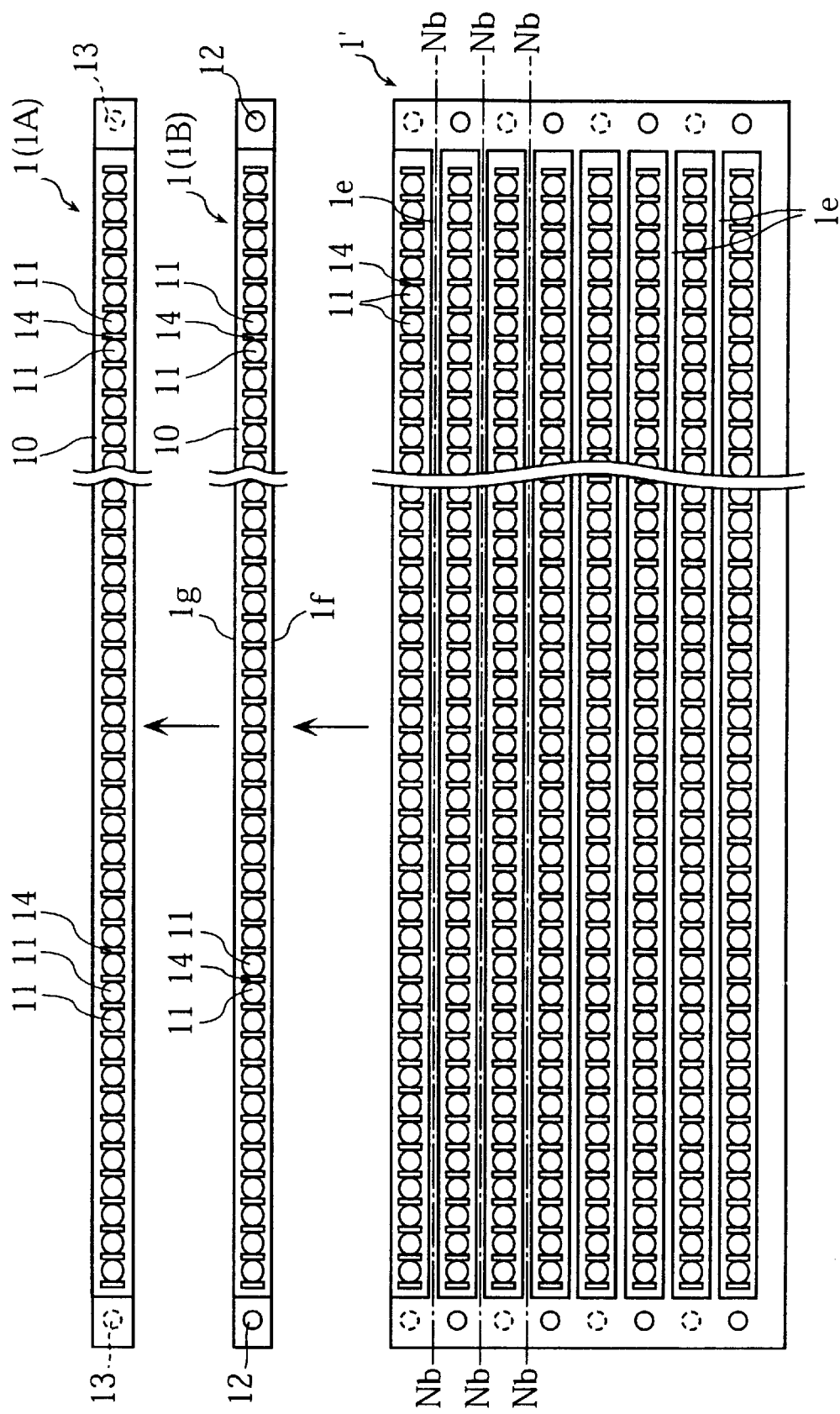
FIG. 11 is a plan view showing the interim resin product divided into a plurality of lens arrays.

Referring to FIG. 11, the interim product 1' is divided along the respective Nb—Nb lines by a cutting device after the transparent layer 16 is formed. Thus, a predetermined number of lens arrays 1 are obtained. All of the obtained lens arrays 1 are identical to each other, though half of them are formed with recesses 13 at their ends, while the other half are formed with projections 12 instead of the recesses 13. For instance, the first lens array 1(1A) is provided at its bottom surface with recesses 13, while the second lens array 1(1B) is provided at its top surface with projections 12. As readily seen, the longitudinal side surfaces 1f, 1g of each lens array 1 are not covered by the light shielding layer 15. Where appropriate, those side surfaces may also be coated with black paint.

The collective production of a plurality of lens arrays from a single mother board is advantageous to improving the production efficiency. In particular, the forming of the light shielding layer 15 and transparent layer 16 is performed collectively for all of the lens arrays 1 before dividing the interim product 1'. In this manner, the time needed to produce the lens arrays 1 is greatly reduced.

According to the present invention, the dividing of the interim product 1' into smaller elements may be performed as follows. First, the interim product 1' is formed with separation-aiding grooves each of which extends in a corresponding one of the intermediate portions 1e. Then, an external force is applied on the interim product 1' to simply snap it along the Nb—Nb lines.

The lens arrays 1 obtained from the interim product 1' may be used in the following manners.

Figure 12:
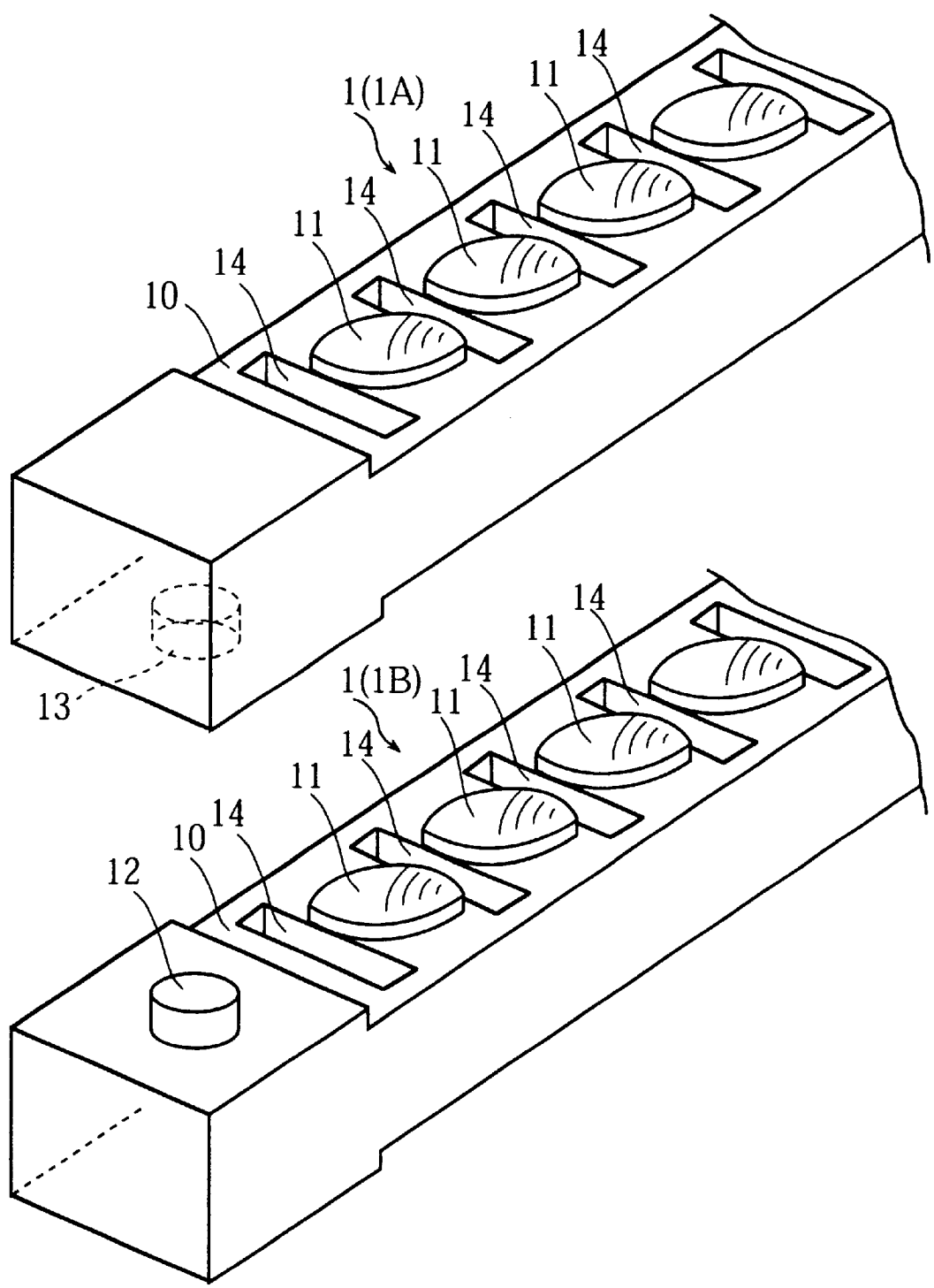
FIG. 12 is a perspective view showing principal parts of two lens arrays used in combination.
Figure 13:
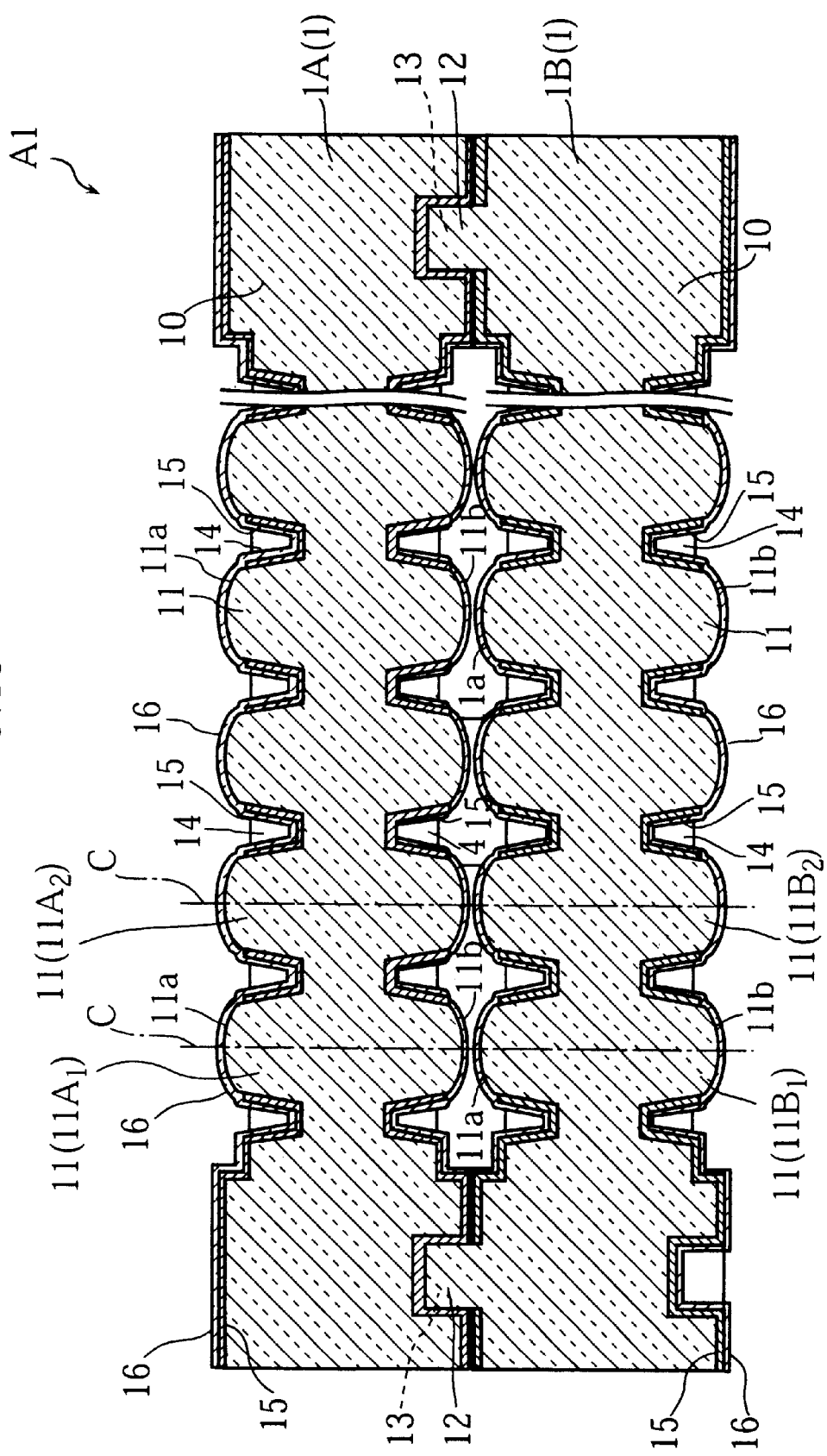
FIG. 13 is a sectional view showing a lens assembly consisting of the lens arrays shown in FIG. 12.

Referring to FIGS. 12 and 13, a lens array assembly A1 is provided by the combination of two lens arrays. Specifically, the first lens array 1A is mounted on the second lens array 1B with the projections 12 of the second lens array 1B fitted into the recesses of the first lens array 1A. As will be described later, the lens array assembly A1 is designed to focus an image of a selected object in a non-magnifying and non-inverting manner.

The first and the second lens arrays 1A and 1B are identical to each other except for the recesses 13 or projections 12. Thus, in the assembled state, the optical axes C of the respective lenses 11 of the first lens array 1A coincide with the optical axes of the respective lenses 11 of the second lens array 1B. More precisely, the optical axis C of the lens 11A1 of the first lens array 1A coincides with the optical axis of the counterpart lens 11B1 of the second lens array 1B. Similarly, the optical axis C of the lens 11A2 of the first lens array 1A coincides with the optical axis of the counterpart lens 11B2 of the second lens array 1B, and so on.

According to the present invention, in each of the first and second lens arrays 1A and 1B, the lenses 11 and the holder portion 10 are formed integral with each other. In other words, the lenses 11 and the holder portion 10 are formed as a one-piece element.

FIG. 14A illustrates the function of the lens array assembly A1. For simplicity of illustration, the transparent layers 16 formed on the first and second lens arrays are not depicted in the figure. As shown, light reflected on an object (c→b→a), which is elongated along the starting line S, will pass through the lenses 11 of the first lens array 1A and then the lenses 11 of the second lens array 1B to finally reach the focusing position F. In the illustrated example, any one of the lenses 11 of the first lens array 1A and its counterpart lens 11 of the second lens array 1B cooperate to behave like a self-focusing lens. Thus, the non-inverted and non-magnified image (c'→b'→a') of the object (c→b→a) at the point S is generated at the focusing position F.

The lens array assembly A1 described above may preferably be used in a contact-type scanner, a line image sensor, etc. As stated above, the lens surfaces 11a, 11b of the respective lenses 11 are smoothed out by the transparent layer 16. Thus, the resulting image (c'→b'→a') at the focusing position F is highly distinctive. Further, the lens array assembly A1 can be made advantageously compact since it only consists of two elongated lens arrays each of which has a small width.

Figure 14B:
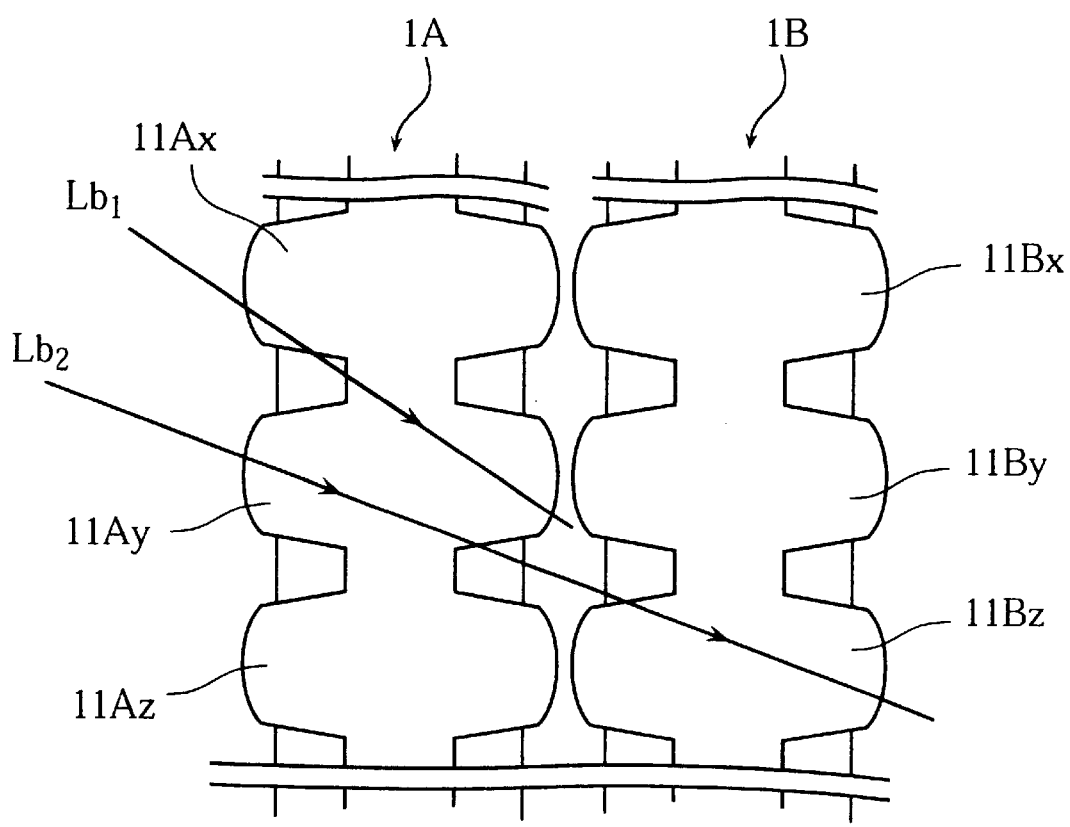
FIG. 14B illustrates how cross talk of light occurs without the light shielding layer.

According to the illustrated arrangement, the light shielding layers 15 prevent the light reflected on the object (c→b→a) from entering the lens assembly A1 through any portion other than the lens surfaces 11a of the first lens array 1A. The light shielding layers 15 also prevent the "cross talk" of light. Without these layers, as shown in FIG. 14B, a light beam Lb1 may unduly stray into a wrong lens 11Ay from the upper lens 11Ax within the first lens array 1A, or a light beam Lb2 passing through the lens 11Ay of the first lens array 1A may go into a wrong lens 11Bz of the second lens array 1B other than the intended lens 11By.

Due to the above preventive features, the lens assembly A1 of the present invention can provide a clear, non-inverted and non-magnified image of an object.

Figure 15:
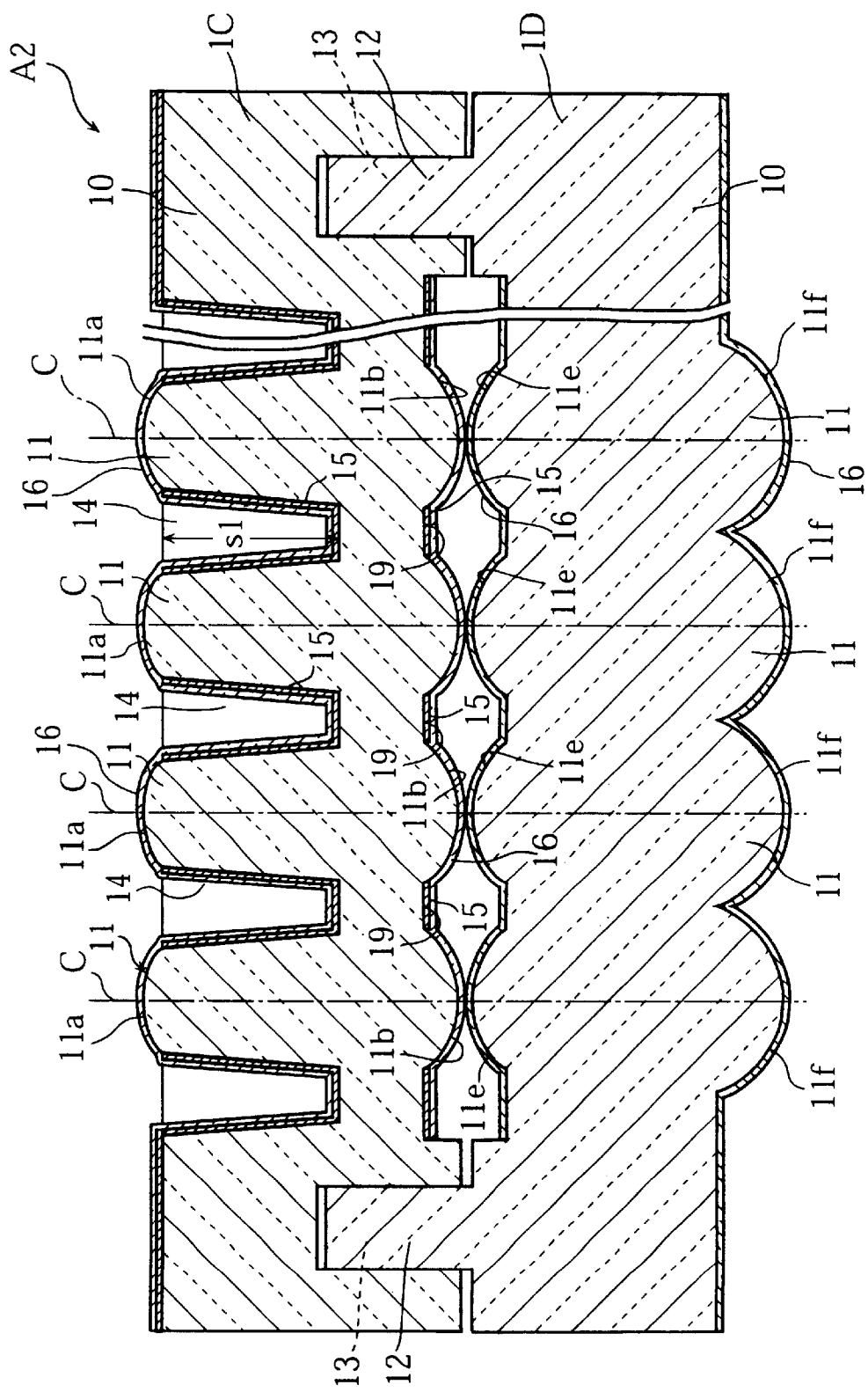
FIG. 15 is a sectional view showing a different type of lens assembly embodying the present invention.

FIG. 15 illustrates another type of lens assembly provided in accordance with the present invention. The illustrated lens assembly A2 consists of two different lens arrays 1C and 1D. Each of the lens arrays 1C, 1D is provided with a plurality of convex lenses 11 with aligned optical axes C, as in the first and second lens arrays 1A, 1B.

Differing from the first and second lens arrays 1A, 1B, the upper or third lens array 1C is formed with grooves 14 only on one side (the upper side in FIG. 15). The depth s1 of each groove 14 of the third lens array 1C is greater than the counterpart of the first or second lens array 1A, 1B. On the lower side of the lens array 1C, flat portions 19 are formed between the second lens surfaces 11b of the respective lenses 11. As seen from FIG. 15, the first lens surface 11a of each lens 11 of the third lens array 1C is smaller in diameter than the second lens surface 11b. A dark-colored (preferably, black) light shielding layer 15 is formed on the upper and lower sides of the lens array 1C except at least the first and second lens surfaces 11a, 11b of the respective lenses 11. The light shielding layer 15 and these lens surfaces are covered by a transparent layer 16.

As opposed to the third lens array 1C, the lower or fourth lens array 1D is not provided with grooves between the lenses 11 nor with a light shielding layer. The first lens surfaces 11e of the fourth lens array 1D are, in diameter, equal to or greater than the second lens surfaces 11b of the third lens array 1C. The second lens surfaces 11f of the fourth lens array 1D are greater in diameter than the first lens surfaces 11e. As viewed longitudinally of the fourth lens array 1D, the second lens surfaces 11f are continuous, whereas the first lens surfaces 11e are spaced from each other. A transparent layer 16 for smoothing out surface irregularities is formed to cover at least the first lens surfaces 11e and the second lens surfaces 11f. In the assembled state, the second lens surfaces 11b of the third lens array 1C are arranged very close to the first lens surfaces lie of the fourth lens array 1D.

Figure 16:
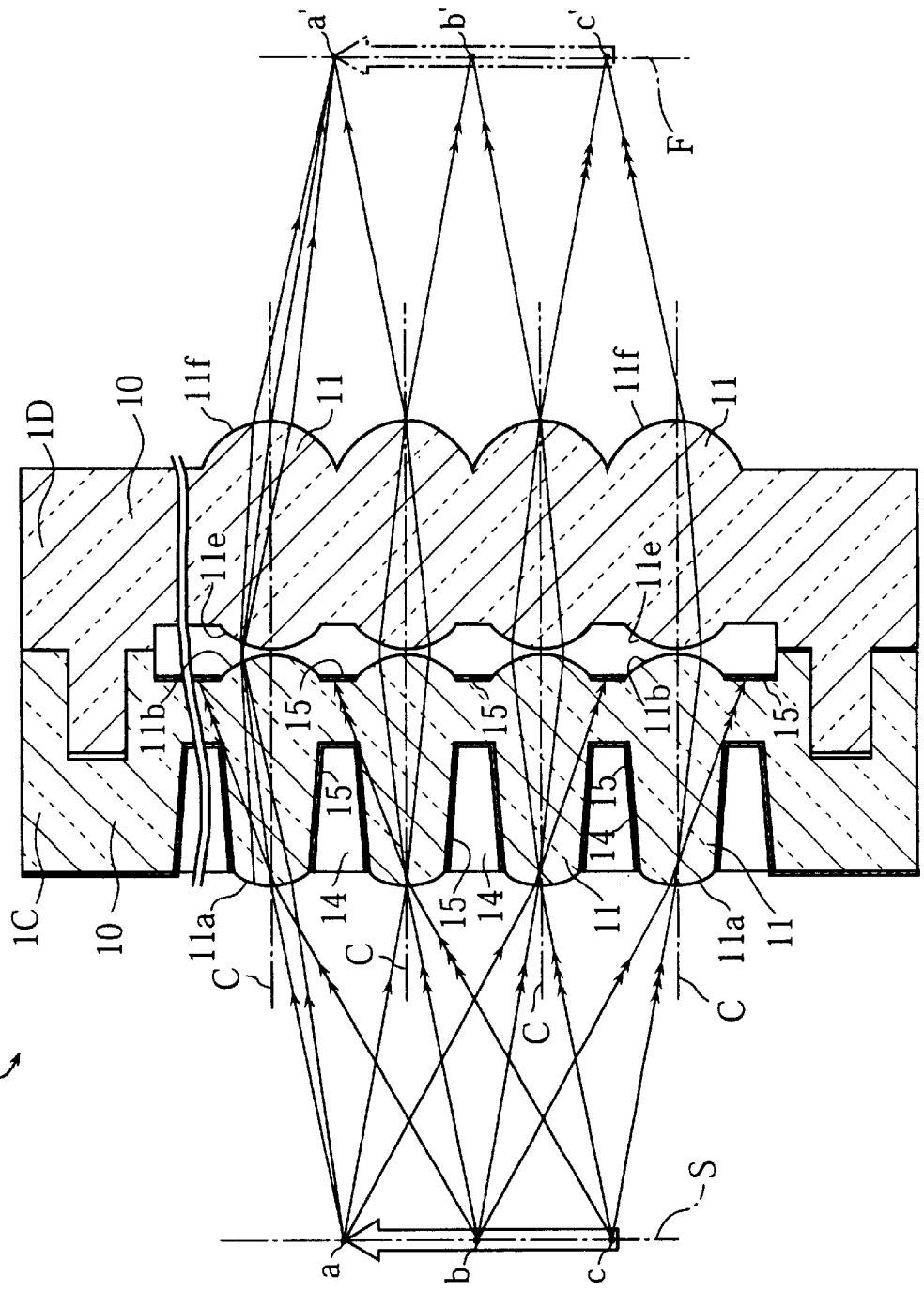
FIG. 16 is a sectional view illustrating the function of the lens assembly of FIG. 15.

As shown in FIG. 16, the lens assembly A2 produces the image of an object (c→b→a) in a non-inverted and non-magnifying manner, as with the lens assembly A1.

As stated above, the grooves 14 in the lens assembly A2 are provided only on one side of the third lens array 1C. However, the cross talk of light is properly prevented in the lens assembly A2 due to the appropriate depth of the grooves 14. The fourth lens array 1D is provided with no such grooves and no light shielding layer. However, light beams which would otherwise cause cross talk in the fourth lens array 1D are shielded by the light shielding layer 15 of the third lens array 1C and prevented from going into the fourth lens array 1D.

As mentioned above, the diameter of the second lens surfaces 11b of the third lens array 1C is greater than that of the first lens surfaces 11a, and the diameter of the second lens surfaces 11f is greater than that of the first lens surfaces 11e. The diameter of the second lens surfaces 11b of the third lens array 1C is equal to or greater than that of the first lens surfaces lie of the fourth lens array 1D. Thus, as seen from FIG. 16, the incident light striking upon the first lens surfaces 11a of the third lens array 1C is properly led through the third lens array 1C and the fourth lens array 1D and finally to the focusing position F without unduly reducing the light intensity. Consequently, the resulting image (c'→b'→a') becomes appropriately bright.

Figure 17:
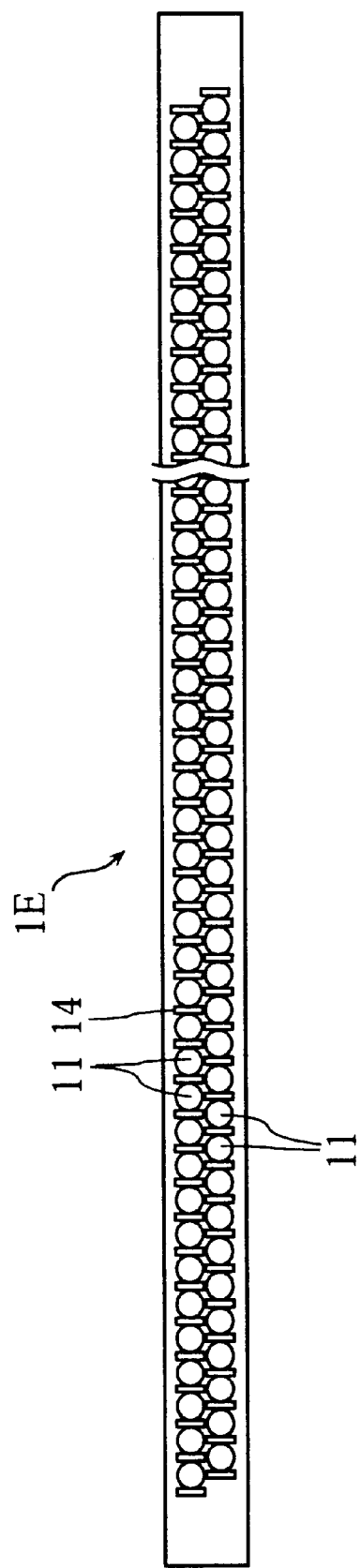
FIG. 17 is a plan view showing a lens array in accordance with the present invention.

FIG. 17 shows a fifth lens array 1E according to the present invention. As illustrated, the lens array 1E is provided with a plurality of lenses 11 arranged in two parallel rows. In the respective rows, each of the lenses 11 is flanked by two grooves 14 as viewed from above (FIG. 17) and from below (not shown). With such an arrangement, the lens array 1E can generate a more brighter image than a lens array provided with only one row of lenses. With the use of a single lens array, an inverted and reduced image is obtained. Two lens arrays with one mounted on the other can produce a non-inverted and non-magnified image.

Figure 18:
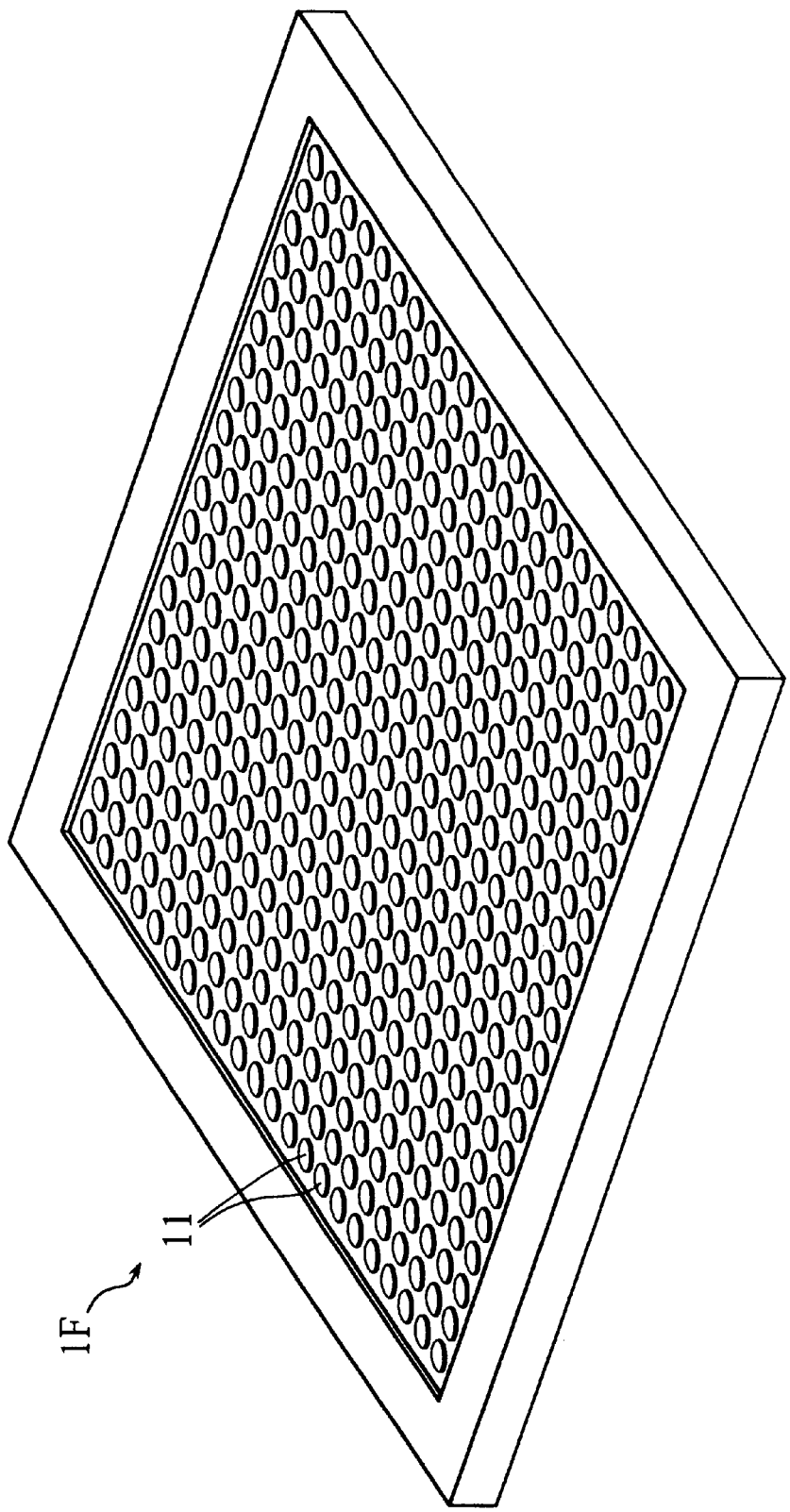
FIG. 18 is a perspective view showing a lens array with a plurality of lenses arranged in a matrix-like configuration.

FIG. 18 shows a sixth lens array 1F according to the present invention. The illustrated lens array 1F is provided with a matrix of lenses 11, which is suitable for producing a two-dimensional image. An identical lens array may be mounted on the lens array 1F to provide a non-inverting and non-magnifying lens assembly. According to the present invention, the number and arrangement of the lenses 11 may be varied.

According to the present invention, each lens may have two opposed lens surfaces which are both convex or both concave. In certain applications, only one of the lens surfaces may be convex or concave, while the other lens surface may be flat. In such an instance, the flat lens surface may not be covered by a surface-smoothing transparent layer. A concave lens array may be used in combination with a concave lens array to provide a lens assembly which does not suffer from chromatic aberration.

According to the present invention, the transparent layer for smoothing out a surface may not be completely clear. As long as proper light passage is not hindered, the transparent layer may be colored.

Figure 19A:
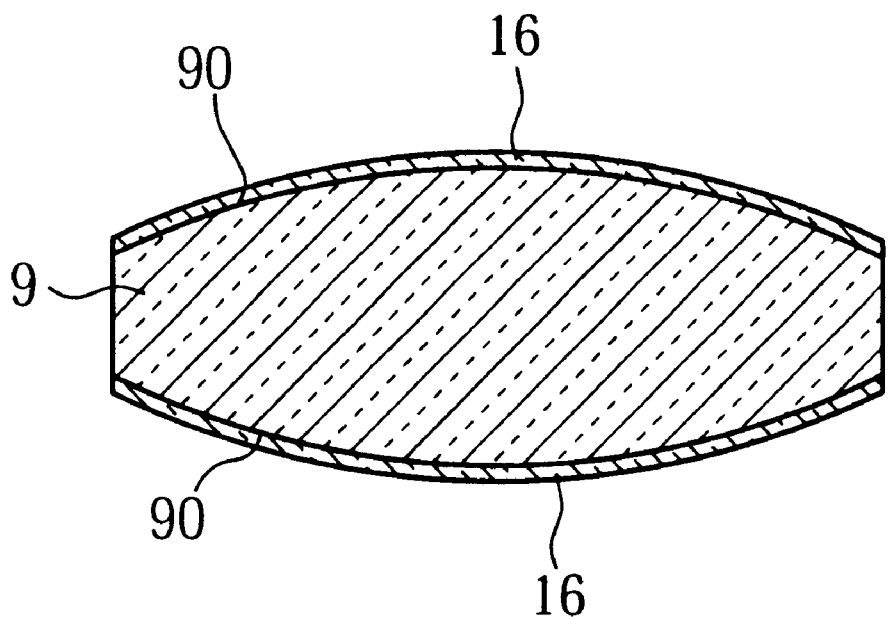
FIG. 19A is a sectional view showing a single convex lens on which a transparent layer is formed.
Figure 19B:
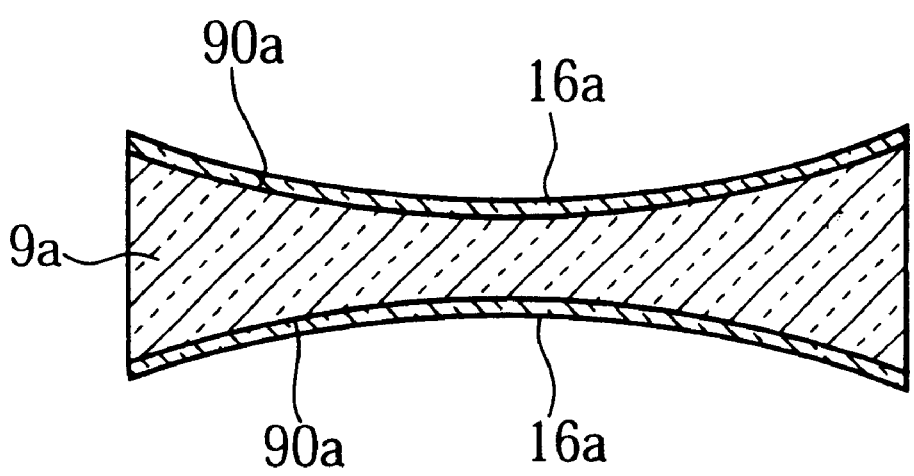
FIG. 19B is a sectional view showing a single concave lens on which a transparent layer is formed.

The present invention is applicable not only to a lens array or lens assembly but also to a single lens. FIG. 19A shows a convex lens 9 whose lens surfaces 90 are covered by a transparent layer 16. FIG. 19B shows a concave lens 9a whose lens surfaces 90a are covered by a transparent layer 16a.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. A lens array comprising:
   a plurality of lenses each of which is provided with an outer lens surface;
   a holder portion for fixing the lenses, the holder portion having outer surfaces;
   a light shielding layer formed on the outer surfaces of the holder portion without covering the outer lens surface of each lens; and
   a transparent layer for covering the outer lens surface of each lens in direct contact therewith, the transparent layer also covering the light shielding layer in direct contact therewith.

2. The lens array according to claim 1, wherein the holder portion and the lenses are made of a same transparent resin material and formed as a one-piece element.

3. The lens array according to claim 1, wherein the transparent layer is made of an acrylic material.

4. The lens array according to claim 1, wherein the holder portion is provided with a plurality of grooves, each of the lenses being located between two grooves.

5. The lens array according to claim 4, wherein each of the grooves is provided with inner wall surfaces covered by the light shielding layer.

6. The lens array according to claim 1, wherein the light shielding layer is a dark-colored layer.

7. The lens array according to claim 1, wherein the transparent layer overlaps the light shielding layer.

8. The lens array according to claim 1, further comprising engaging means for associating with an additional lens array.

9. The lens array according to claim 1, wherein each of the lenses is provided with first and second lens surfaces which are unequal in diameter to each other.

10. A method of making a lens array comprising steps of:
    molding a transparent resin material into a resin element provided with a plurality of lenses;
    forming a transparent layer for covering at least a lens surface of each lens, and
    dividing the resin element into a plurality of lens arrays.

11. The method according to claim 10, wherein the transparent layer is formed by spraying a transparent acrylic material onto the lens surface of each lens.

12. The method according to claim 11, wherein the acrylic material has a viscosity of 10–100 mP (20° C.).

13. The method according to claim 10, further comprising a step of forming a light shielding layer on the resin element before the forming of the transparent layer.

14. The method according to claim 13, wherein the transparent layer overlaps the light shielding layer.

15. The method according to claim 13, wherein the light shielding layer is formed by ejecting dark-colored ink onto the resin element.

16. The method according to claim 15, wherein the ejecting of ink is performed by an inkjet printer.

17. A method of making a lens array comprising steps of:
    molding a transparent resin material into a resin element provided with a plurality of lenses; and
    forming a transparent layer for covering at least a lens surface of each lens;

wherein the transparent layer is formed by spraying a transparent acrylic material onto the lens surface of each lens.

18. The method according to claim 17, wherein the acrylic material has a viscosity of 10–100 mP (20° C.).

19. A method of making a lens array comprising steps of:

molding a transparent resin material into a resin element provided with a plurality of lenses;

forming a light shielding layer on the resin element;

forming a transparent layer for covering at least a lens surface of each lens;

wherein the light shielding layer is formed by ejecting dark-colored ink onto the resin element.

20. The method according to claim 19, wherein the ejecting of ink is performed by an inkjet printer.

* * * * *